US007123654B2

(12) United States Patent
Song

(10) Patent No.: US 7,123,654 B2
(45) Date of Patent: Oct. 17, 2006

(54) METHOD AND APPARATUS TO ENCODE A MOVING IMAGE WITH FIXED COMPUTATIONAL COMPLEXITY

(75) Inventor: Byung-cheol Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 856 days.

(21) Appl. No.: 10/321,537

(22) Filed: Dec. 18, 2002

(65) Prior Publication Data

US 2003/0156643 A1    Aug. 21, 2003

(30) Foreign Application Priority Data

Feb. 19, 2002    (KR)    ............................ 2002-0008759

(51) Int. Cl.
*H04B 1/66* (2006.01)

(52) U.S. Cl. ........................... 375/240.02; 375/240.12; 375/240.05; 375/240.07; 375/240.23; 375/240.25; 375/240.2; 382/238; 382/239; 382/250; 382/251; 382/246; 382/233; 382/235

(58) Field of Classification Search ........... 375/240.02, 375/240.2, 240.12, 240.05, 240.07, 240.23, 375/240.25; 382/238, 239, 250, 251, 246, 382/233, 235

See application file for complete search history.

(56) References Cited

U.S. PATENT DOCUMENTS 6,567,469 B1 *    5/2003    Rackett    .................. 375/240.16

6,748,019 B1 *    6/2004    Lin et al.    ................ 375/240.24

FOREIGN PATENT DOCUMENTS

| JP | 4-56942 | 2/1992 |
| JP | 7-23394 | 1/1995 |
| JP | 2000-59767 | 2/2000 |
| JP | 2001-36908 | 2/2001 |

OTHER PUBLICATIONS

Japanese Office Action issued on May 17, 2005 in Japanese Application 2002-353026 which corresponds to U.S. Appl. No. 10/321,537.

* cited by examiner

*Primary Examiner*—Shawn S. An
(74) *Attorney, Agent, or Firm*—Staas & Halsey LLP

(57) ABSTRACT

An apparatus and method thereof to encode a moving image include a discrete cosine transform (DCT) unit performing a DCT process on input video data, a quantizer, and a motion estimation (ME) unit calculating a motion vector and a SAD per macro block. A DCT computational complexity calculator calculates a computational complexity of the ME unit, estimates a difference between the ME computational complexity and a target ME computational complexity, and updates a target DCT computational complexity based on the estimated difference. A DCT skipping unit sets a threshold value to determine whether to skip performing the DCT process on the input video data, based on the target DCT computational complexity updated by the DCT computational complexity calculator, compares the SAD per macro block, and the quantization parameter with the threshold value, and determines whether to allow the DCT unit to perform the DCT process on the input video data.

22 Claims, 4 Drawing Sheets

METHOD AND APPARATUS TO ENCODE A MOVING IMAGE WITH FIXED COMPUTATIONAL COMPLEXITY

CROSS-REFERENCE TO RELATED APPLICATIONS

This application is based upon and claims priority from Korean Patent Application No. 2002-8759 filed Feb. 19, 2002 in the Korean Intellectual Property Office, the disclosure of which is incorporated herein by reference.

BACKGROUND OF THE INVENTION

1. Field of the Invention

The present invention relates to a video encoding system, and more particularly, to a method and apparatus to encode a moving image using fixed computational complexity, irrespective of characteristics of the moving image.

2. Description of the Related Art

Conventionally, a moving image is encoded using hardware. However, an improvement in performance of a central processing unit (CPU) of a personal computer (PC) and development of a high-performance media processor make it possible to encode the moving image using software. Consequently, an encoding technique to effectively reduce an amount of calculation is required to compress and restore the moving image in real time. For instance, if a motion of the moving image is estimated with a conventional video encoder according to H.263 standards using an n-step search, a discrete cosine transform (DCT)/inverse DCT module accounts for thirty percent (30%) of the processing time in a conventional video encoder. To reduce such computational complexity, the conventional video encoder uses a DCT skipping technique.

FIG. 1 is a block diagram of a conventional video encoding system. First, input video data is divided into group-of-pictures (GOP) units. A discrete cosine transform (DCT) unit 120 performs a DCT process on the video data on 8×8 block-by-block basis to obtain spatial redundancy in the video data. A quantizer (Q) 130 quantizes the video data on which the DCT process is performed. An inverse quantizer (IQ) 150 inversely quantizes the video data quantized by the Q 130. An inverse DCT (IDCT) 160 performs an IDCT process on the video data that is inversely quantized by the IQ 150. A frame memory (FM) unit 170 stores the video data, which is IDCT processed by the IDCT unit 160, in frame units. A motion estimation (ME) unit 180 estimates a motion vector (MV) and a sum of absolute difference (SAD) of the moving image per macro block using video data of a current frame and video data of a previous frame stored in the FM unit 170. A variable length coding (VLC) unit 140 removes statistical redundancy in the video data quantized according to the MV estimated by the ME unit 180.

A DCT skipping unit 110 receives the SAD per block estimated by the ME unit 180 or a quantization parameter (QP) generated by the Q 130, compares the SAD or the QP with a threshold value T, and sends to the DCT unit 120 the comparing result as skipping information on the 8×8 block-by-block basis. That is, the DCT skipping unit 110 restricts the video data not to be coded if a ratio SAD/QP is smaller than the threshold value T, which means that an end of block is approximately 0, and allows the DCT unit 120 to perform the DCT process on the video data if the ratio SAD/QP is larger than the threshold value T. However, in a case that the threshold value T is a fixed value within a video sequence, complexity in DCT computation becomes different per macro block or frame. In particular, when a software video encoder is executed by a PC or a media processor, real-time encoding is impossible due to limits in the computational complexity of the PC or media processor if the DCT computational complexity changes according to the macro block or the frame.

SUMMARY OF THE INVENTION

In accordance with an aspect of the present invention, there is provided a moving encoding method capable of keeping fixed a computational complexity of a video encoder by applying a variation in computational complexity in a motion estimator to a discrete cosine transform (DCT) module.

In accordance with an aspect of the present invention, there is provided a method of encoding a moving image, the method including calculating motion estimation (ME) computational complexity of video data, and estimating a difference between the calculated ME computational complexity and a target ME computational complexity; updating a target discrete cosine transform (DCT) complexity based on the difference between the calculated ME computational complexity and the target ME computational complexity; setting a threshold value in order to determine whether to skip performing a DCT process on the video data based on the updated target DCT complexity; and skip performing the DCT process or performing the DCT process on video data according to the set threshold value.

In accordance with an aspect of the present invention, there is provided an apparatus for encoding a moving image, the apparatus including: a discrete cosine transform (DCT) unit performing a DCT process on input video data on a block-by-block basis; a quantizer quantizing the input video data on which the DCT process is performed and generating a quantization parameter; a motion estimation (ME) unit calculating a motion vector and a sum of absolute difference (SAD) per macro block, using the input video data and video data of a previous frame; a DCT computational complexity calculator calculating a computational complexity of the ME unit, estimating a difference between the ME computational complexity and a target ME computational complexity, and updating a target DCT computational complexity based on the estimated difference; and a DCT skipping unit setting a threshold value to determine whether to skip performing the DCT process on the input video data, based on the target DCT computational complexity updated by the DCT computational complexity calculator, comparing the SAD per macro block and the quantization parameter with the threshold value, and determining whether to allow the DCT unit to perform the DCT process on the input video data.

In accordance with an aspect of the present invention, there is provided an apparatus to encode a moving image, including: a DCT unit performing a DCT process on video data in an 8×8 block-by-block unit or processing the video data not to be coded; a motion estimation (ME) unit estimating a motion vector (MV) and a sum of absolute difference (SAD) per macro block using the video data of a current frame and the video data of a previous frame; a motion estimation (ME) computational complexity calculator averaging or adding search points per macro block to calculate an overall or total ME computational complexity $S(n)$ of the current frame; and a target DCT computational complexity calculator comparing the overall ME computational complexity $S(n)$ with a target ME computational complexity $S_t$, calculating a difference therebetween, and adding the difference to a target DCT computational complexity $C_t$ to change the target DCT computational complexity $C_t$ to obtain an updated DCT computational complexity $C'_t$.

In accordance with an aspect of the present invention, there is provided an apparatus to encode a moving image, including: a discrete cosine transform (DCT) skipping unit generating a DCT skipping control signal; a DCT unit performing a DCT process on video data in an 8×8 block-by-block unit or processing the video data not to be coded in response to the DCT skipping control signal; a motion estimation (ME) unit estimating a motion vector (MV) and a sum of absolute difference (SAD) per macro block using the video data of a current frame and the video data of a previous frame; and a DCT computational complexity calculator calculating an overall ME computational complexity of the previous frame to estimate a difference between the overall ME computational complexity and a target ME and applying the difference to the DCT skipping unit to maintain an amount of overall DCT computation close to a target DCT computational complexity.

In accordance with an aspect of the present invention, there is provided a computer readable storage controlling a computer to estimate a motion of a moving image and including a process of encoding a moving image, including: calculating motion estimation (ME) computational complexity of video data, and estimating a difference between the calculated ME computational complexity and a target ME computational complexity; updating a target discrete cosine transform (DCT) complexity based on the difference between the calculated ME computational complexity and the target ME computational complexity; setting a threshold value in order to determine whether to skip performing a DCT process on the video data based on the updated target DCT complexity; and skip performing the DCT process or performing the DCT process on video data according to the set threshold value.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE INVENTION

Figure 1:
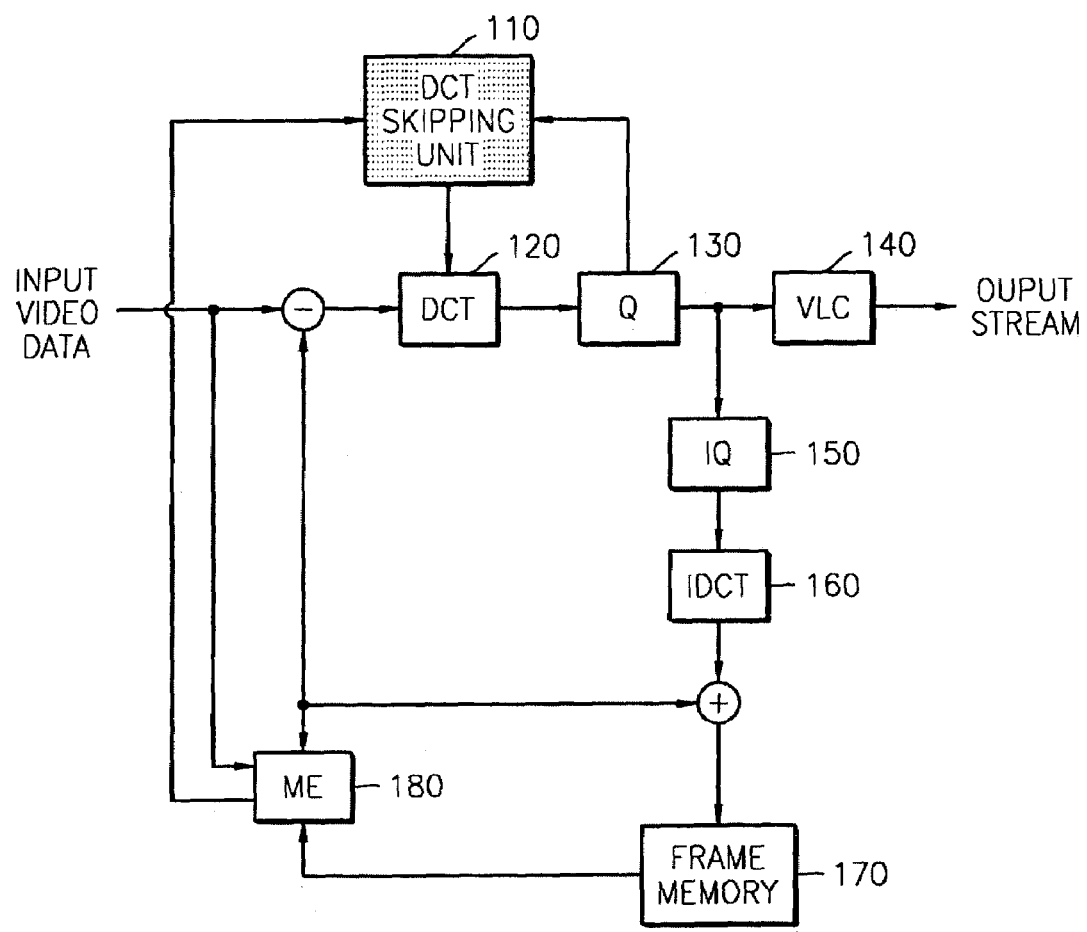
FIG. 1 is a block diagram of a conventional video encoding system to which a discrete cosine transform (DCT) skipping technique is applied.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
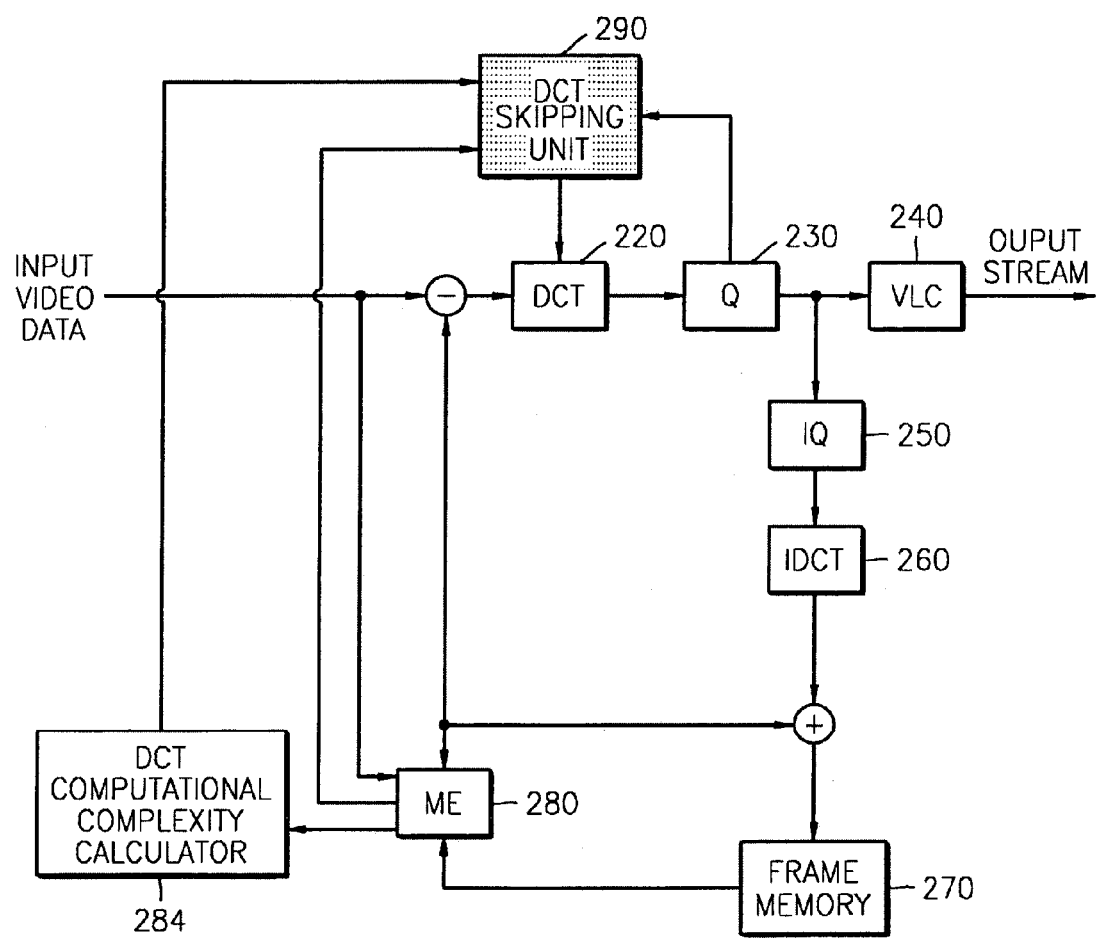
FIG. 2 is a block diagram of a structure of a video encoder, according to an aspect of the present invention.

FIG. 2 is a block diagram of a structure of a video encoder according to an aspect of the present invention. Referring to FIG. 2, input video data includes frames in 8×8 block units.

A discrete cosine transform (DCT) unit 220 performs a DCT process on the input video data on an 8×8 block-by-block unit or processes the input video data not to be coded in response to a DCT skipping control signal generated by a DCT skipping unit 290. A quantizer (Q) 230 quantizes the video data on which the DCT process is performed by the DCT unit 220. A variable length coding (VLC) unit 240 remove statistical redundancy in the quantized video data. An inverse quantizer (IQ) 250 inversely quantizes the quantized video data. An inverse DCT (IDCT) unit 260 performs an IDCT process on the inversely quantized video data. A frame memory (FM) unit 270 stores the video data, on which the IDCT process is performed by the IDCT unit 260 in frame units. A motion estimator (ME) 280 estimates a motion vector (MV) and a sum of absolute difference (SAD) per macro block, using the video data of a current frame and video data of a previous frame stored in the FM unit 270.

A DCT computational complexity calculator 284 calculates an overall motion estimation computational complexity of the previous frame used by the ME unit 280 in order to estimate a difference between the overall motion estimation computational complexity and a target, and updates a target DCT computational complexity based on the difference.

The DCT skipping unit 290 sets a threshold value $T_{on+1}$ according to the updated target DCT computational complexity to skip performing the DCT process on the current frame. Next, the DCT skipping unit 290 compares the SAD per block estimated by the ME unit 280 and a quantization parameter (QP) estimated by the Q 230 with the set threshold value $T_{on+1}$, and sends the DCT unit 220 the compared result as DCT skipping information.

Figure 3:
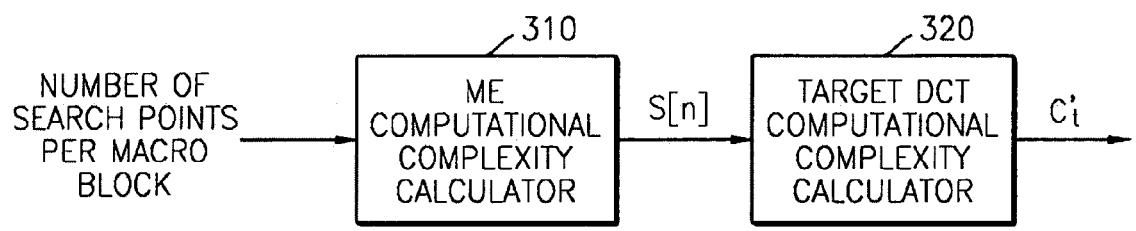
FIG. 3 is a block diagram of a structure of a DCT computational complexity calculator of FIG. 2.

FIG. 3 is a block diagram of the structure of the DCT computational complexity calculator 284 of FIG. 2. Referring to FIG. 3, a motion estimation (ME) computational complexity calculator 310 averages or adds the numbers of search points per macro block input from the ME unit 280 to calculate an overall or total ME computational complexity S(n) of the current frame.

A target DCT computational complexity calculator 320 compares the overall ME computational complexity S(n) with a target ME computational complexity St, calculates a difference therebetween, and adds the difference to the target DCT computational complexity $C_t$. As a result, the target DCT computational complexity $C_t$ is changed to obtain an updated DCT computational complexity $C'_t$.

Figure 4:
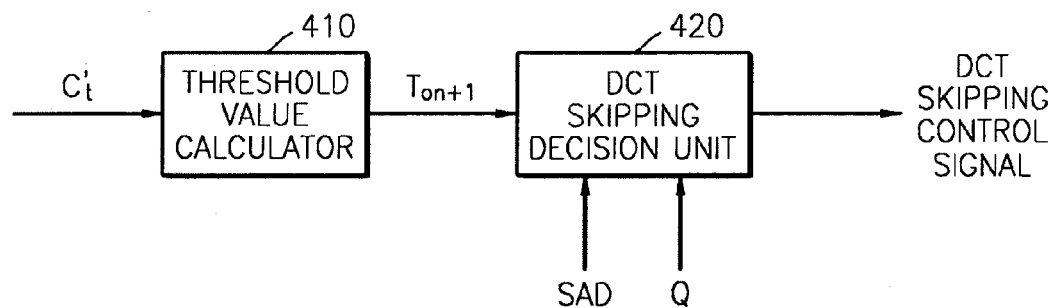
FIG. 4 is a block diagram of a structure of a DCT skipping unit of FIG. 2.

FIG. 4 is a block diagram of the structure of the DCT skipping unit 290 of FIG. 2. Referring to FIG. 4, a threshold value calculator 410 calculates the threshold value $T_{on+1}$, of the current frame, based on the updated target DCT computational complexity $C'_t$ to which a difference in the ME computational complexity is reflected.

A DCT skipping decision unit 420 compares a sum of absolute difference (SAD) per block and a quantization parameter (QP), which are respectively estimated by the ME unit 280 and the Q 230, with the threshold value $T_{on+1}$ of the current frame to obtain a compared result, and determines whether or not the DCT unit 220 of FIG. 2 skips performing the DCT process on the current frame, based on the compared result. More specifically, the DCT skipping decision unit 420 enforces the current frame to be 'not-coded' data when the SAD/QP is smaller than the threshold value $T_{on+1}$, which means that an end of block (EOB) is likely to approximate 0, and allows the DCT unit 220 to perform the DCT process on the current frame when the SAD/QP is larger than the threshold value $T_{on+1}$.

Figure 5:
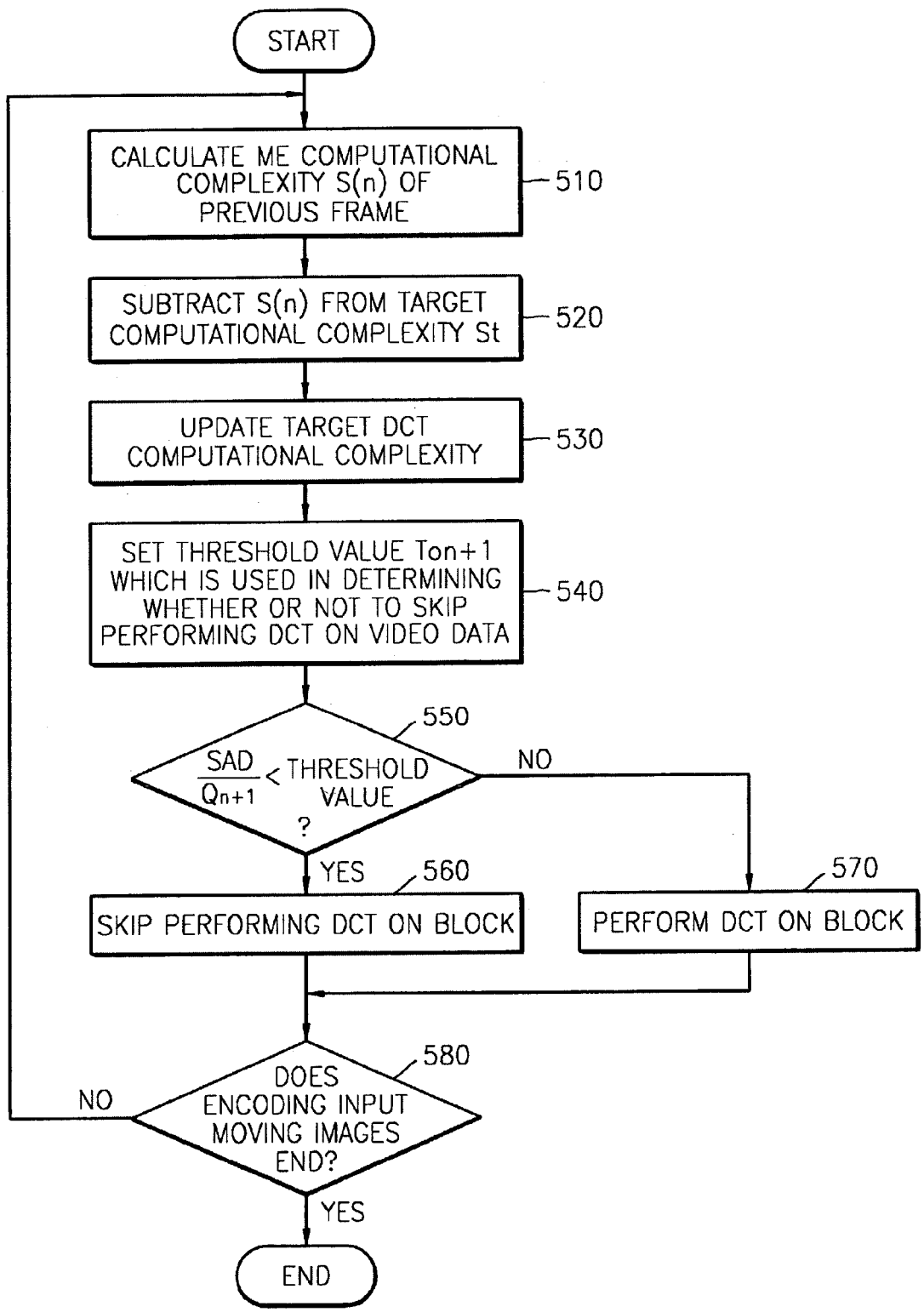
FIG. 5 is a flowchart illustrating a method of encoding a moving image according to an aspect of the present invention.

FIG. 5 is a flowchart illustrating a method of encoding a moving image according to an aspect of the present invention. Referring to FIG. 5, first, the target motion estimation (ME) computational complexity $S_t$ and the target DCT computational complexity $C_t$ are set, based on an overall encoder computational complexity. For instance, in H.263 video encoder, the target ME computational complexity $S_t$ and the target DCT computational complexity $C_t$ of a search region are set to be 0.3, respectively, on an assumption the overall encoder computational complexity is 1.

Next, at operation 510, search point numbers per macro block of an nth frame are averaged to calculate the overall ME computational complexity S(n). In this case, general high-speed motion estimation methods are disadvantageous in that searching computational complexity per macro block is not constant. The general high-speed motion estimation methods are classified into methods, wherein the number of search points in search regions is not the same and methods and a calculation required per block matching is effectively reduced, e.g., a fast-full searching method. The ME computational complexity per frame can be calculated by one of the above methods.

After operation 510, at operation 520, the ME computational complexity S(n) of the previous frame is subtracted from the target ME computational complexity $S_t$ to obtain a difference, i.e., $S_t-S(n)$, in the ME computational complexity. In other words, the method checks whether the ME computational complexity S(n) of the previous frame is larger or smaller than the target ME computational complexity St, which is based on the fact that the ME computational complexity of continuous frames, e.g., the previous frame and the current frame, are similar.

After operation 520, at operation 530, the difference $S_t-S(n)$ is added to the original target DCT computational complexity $C_t$ to obtain an updated target DCT computational complexity $C'_t$. Here, the target ME computational complexity $S_t$ and the ME computational complexity S(n) of the previous frame denote the average number of search points per macro block, and the target DCT computational complexity $C_t$ denotes the total number of DCT performing blocks per macro block. Thereafter, the difference St−S(n) is just added to the original target DCT computational complexity Ct on an assumption that computational complexity spent processing one search point is the same as 8'8 DCT computational complexity. Otherwise, i.e., if the computational complexity spent processing one search point is different from that of the 8'8 DCT computational complexity, the difference St−S(n) is multiplied by a proper weight w and added to the original target DCT computational complexity Ct, thereby obtaining w (St−S(n))+$C_t$.

After operation 530, at operation 540, the threshold value $T_{on+1}$ of the current frame, which is used to determine whether to perform the DCT process on the current frame, is set based on the updated target DCT computational complexity $C'_t$.

An equation to calculate the threshold value $T_{on+1}$ of the current frame is obtained by the following equations.

A DCT complexity refers to probability that the DCT unit performs the DCT process on the video data and DCT computational complexity, and it is determined with the number of DCT performing blocks. Because the threshold value $T_{on+1}$ is inversely proportional to a threshold value and a quantization coefficient ($T_0Q$), the DCT complexity is expressed by the following equation:

$$C \approx \frac{v}{T_0 Q} \quad (1)$$

wherein To denotes a threshold value, and Q denotes a quantization coefficient. In case of an nth frame, a formula of $n=C_nQ_nT_{on}$ is obtained from equation 1.

Also, a threshold value of an n+1st frame may be obtained from equation 1 as follows:

$$T_{on+1} = \frac{v}{C_t Q_{n+1}} \quad (2)$$

wherein $C_t$ denotes the target DCT complexity.

Equation 2 may be also expressed as follows:

$$T_{on+1} = T_{on} \frac{Q_n C_n}{C_t Q_{n+1}} \quad (3)$$

Equation 3 may be also expressed as follows:

$$T_{on+1} = T_{on} \frac{Q_n}{Q_{n+1}} \left(1 + \frac{C_n - C_t}{C_t}\right) \quad (4)$$

Equation 4 may be expressed as follow:

$$T_{on+1} = T_{on} \frac{Q_n}{Q_{n+1}} \left(1 + \frac{C_n - C_t}{kC_t}\right) \quad (5)$$

wherein a convergence speed of the threshold value $T_{on+1}$ depends on a constant k. Referring to equation 5, it is noted that the threshold value $T_{on+1}$ of the current frame is calculated with the threshold value $T_{on}$ of the previous frame, quantization coefficients $Q_n$ and $Q_{n+1}$, and the DCT complexity $C_n$ of the previous frame.

Lastly, if the target DCT complexity $C_t$ presented in equation 5 is updated to a target DCT computational complexity Ct', i.e., $Ct'=C_t+S_t-S_n$, the threshold value $T_{on+1}$ of the current frame, which is applied to the present invention, is calculated as follows:

$$T_{on+1} = T_{on} \frac{Q_n}{Q_{n+1}} \left(1 + \frac{C_n - C'_t}{kC'_t}\right) \quad (6)$$

wherein $T_{on}$ denotes the threshold value of the previous frame, $Q_n$ denotes the quantization coefficient of the previous frame, $Q_{n+1}$ denotes the quantization coefficient of the current frame, $C_n$ denotes the DCT computational complexity of the previous frame, k denotes a constant, and $C'_t$ denotes the updated target DCT computational complexity.

After operation 540, at operation 550, the SAD and quantization parameter $Q_{n+1}$ per block, which are respectively produced during motion estimation and quantization, are compared with the threshold value $T_{on+1}$ of the current frame.

If the SAD/quantization parameter $Q_{n+1}$ is smaller than the threshold value $T_{on+1}$, at operation 560, the DCT process is not performed on a related block and the block is restricted to not to be coded. At operation 570, if the SAD/quantization parameter $Q_{n+1}$ is larger than the threshold value $T_{on+1}$, a DCT process is performed on the block.

After operation 570, at operation 580, the method checks whether or not encoding input moving images ends and if not, the above steps are repeated until the encoding ends.

As described above, according to an aspect of the present invention, a difference in a computational complexity of an ME unit is applied to a DCT skipping module, thereby maintaining an amount of overall DCT computation closely to a target DCT computational complexity Ct+St.

The present invention can be embodied as a computer readable code that can be executed by a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, flash memory, an optical data storage device, and so on. Also, the computer readable medium may be a carrier wave that transmits data via the Internet, for example. The computer readable recording medium can be dispersively installed in a computer system connected to a network, and may store and execute a computer readable code by a distributed computing environment.

As described above, according to an aspect of the present invention, using a DCT skipping method, which is designed in consideration of motion estimation (ME) computational complexity, it is possible to constantly maintain an overall encoding computational complexity even if a high-speed motion estimation method is used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of encoding a moving image, comprising:
   calculating motion estimation (ME) computational complexity of video data, and estimating a difference between the calculated ME computational complexity and a target ME computational complexity;
   updating a target discrete cosine transform (DCT) complexity based on the difference between the calculated ME computational complexity and the target ME computational complexity;
   setting a threshold value in order to determine whether to skip performing a DCT process on the video data based on the updated target DCT complexity; and
   skip performing the DCT process or performing the DCT process on video data according to the set threshold value.

2. The method of claim 1, wherein the difference in the ME computational complexity is estimated by subtracting the ME computational complexity of a previous frame from the target ME computational complexity.

3. The method of claim 2, wherein the ME computational complexity is obtained by calculating a number of search points per macro block.

4. The method of claim 1, wherein the target DCT complexity is updated by adding the difference in the ME computational complexity to the target DCT complexity.

5. The method of claim 1, wherein the threshold value is of a current frame and is calculated by the following equation:

$$T_{on+1} = T_{on} \frac{Q_n}{Q_{n+1}} \left(1 + \frac{C_n - C'_t}{kC'_t}\right),$$

wherein $T_{on+1}$ denotes a threshold value of the current frame, $T_{on}$ denotes a threshold value of a previous frame, $Q_n$ and $Q_{n+1}$ denote quantization coefficients of the previous frame and quantization coefficients of the current frame, respectively, $C_n$ denotes DCT computational complexity, k denotes a constant, and $C'_t$ denotes the updated target DCT complexity.

6. The method of claim 1, wherein performing the DCT process on the video data is skipped when the threshold value is smaller than $SAD/Q_{n+1}$, and the DCT process is performed on the video data when the threshold value is larger than $SAD/Q_{n+1}$.

7. An apparatus to encode a moving image, comprising:
   a discrete cosine transform (DCT) unit performing a DCT process on input video data on a block-by-block basis;
   a quantizer quantizing the input video data on which the DCT process is performed and generating a quantization parameter;
   a motion estimation (ME) unit calculating a motion vector and a sum of absolute difference (SAD) per macro block, using the input video data and video data of a previous frame;
   a DCT computational complexity calculator calculating a computational complexity of the ME unit, estimating a difference between the ME computational complexity and a target ME computational complexity, and updating a target DCT computational complexity based on the estimated difference; and
   a DCT skipping unit setting a threshold value to determine whether to skip performing the DCT process on the input video data, based on the target DCT computational complexity updated by the DCT computational complexity calculator, comparing the SAD per macro block and the quantization parameter with the threshold value, and determining whether to allow the DCT unit to perform the DCT process on the input video data.

8. The apparatus of claim 7, wherein the DCT computational complexity calculator comprises:
   an ME computational complexity calculator measuring a number of search points per macro block, which is input from the ME unit, and calculating a total ME computational complexity of the previous frame;
   a target DCT computational complexity calculator comparing a total ME computational complexity of a current frame, estimating a difference in the ME computational complexity, adding the difference to the target DCT computational complexity, and obtaining the updated target DCT computational complexity.

9. The apparatus of claim 7, wherein the DCT skipping unit comprises:
  a threshold value calculator calculating the threshold value of a current frame based on the updated target DCT computational complexity; and
  a DCT skipping decision unit comparing the SAD per macro block and the quantization parameter, with the threshold value calculated by the threshold value calculator, and determining whether or not to skip performing the DCT process on the input video data.

10. An apparatus to encode a moving image, comprising:
  a DCT unit performing a DCT process on video data in an 8×8 block-by-block unit or processing the video data not to be coded;
  a motion estimation (ME) unit estimating a motion vector (MV) and a sum of absolute difference (SAD) per macro block using the video data of a current frame and the video data of a previous frame;
  a motion estimation (ME) computational complexity calculator averaging or adding search points per macro block to calculate an overall or total ME computational complexity S(n) of the current frame; and
  a target DCT computational complexity calculator comparing the overall ME computational complexity S(n) with a target ME computational complexity St, calculating a difference therebetween, and adding the difference to a target DCT computational complexity $C_t$ to change the target DCT computational complexity $C_t$ to obtain an updated DCT computational complexity $C'_t$.

11. The apparatus of claim 10, further comprising:
  a quantizer quantizing the video data on which the DCT process is performed; and
  a variable length coding (VLC) unit removing statistical redundancy from the quantized video data.

12. The apparatus of claim 11, further comprising:
  an inverse quantizer (IQ) inversely quantizing the quantized video data; and
  an inverse DCT (IDCT) unit performing an IDCT on the inversely quantized video data.

13. The apparatus of claim 12, further comprising:
  a DCT skipping unit comprising
    a threshold value calculator calculating a threshold value $T_{on+1}$ of the current frame, based on the updated target DCT computational complexity to which the difference in the ME computational complexity is reflected, and
    a DCT skipping decision unit comparing the SAD per block and a quantization parameter (QP) with the threshold value $T_{on+1}$ of the current frame to obtain a compared result, to determine whether to skip performing the DCT process on the current frame.

14. The apparatus of claim 13, wherein the DCT skipping unit sets a threshold value $T_{on+1}$ according to the updated target DCT computational complexity to skip performing the DCT process on the current frame.

15. The apparatus of claim 14, wherein the DCT skipping unit compares the SAD per block estimated by the ME unit and a quantization parameter (QP) estimated by the quantizer with the set threshold value $T_{on+1}$, and sends the DCT unit a compared result as the DCT skipping information.

16. The apparatus of claim 10, further comprising:
  a DCT computational complexity calculator calculating an overall ME computational complexity of the previous frame to estimate a difference between the overall ME computational complexity and the target ME, and updating the target DCT computational complexity $C_t$ based on the difference.

17. The apparatus of claim 10, further comprising:
  a frame memory (FM) unit storing the video data, on which the IDCT unit, in frame units, performs the IDCT.

18. An apparatus to encode a moving image, comprising:
  a discrete cosine transform (DCT) skipping unit generating a DCT skipping control signal;
  a DCT unit performing a DCT process on video data in an 8×8 block-by-block unit or processing the video data not to be coded in response to the DCT skipping control signal;
  a motion estimation (ME) unit estimating a motion vector (MV) and a sum of absolute difference (SAD) per macro block using the video data of a current frame and the video data of a previous frame; and
  a DCT computational complexity calculator calculating an overall ME computational complexity of the previous frame to estimate a difference between the overall ME computational complexity and a target ME and applying the difference to the DCT skipping unit to maintain an amount of overall DCT computation close to a target DCT computational complexity.

19. The apparatus of claim 18, further comprising:
  a quantizer quantizing the video data on which the DCT process is performed; and
  a variable length coding (VLC) unit removing statistical redundancy from the quantized video data.

20. The apparatus of claim 19, further comprising:
  a variable length coding (VLC) unit removing statistical redundancy from the quantized video data;
  an inverse quantizer (IQ) inversely quantizing the quantized video data; and
  an inverse DCT (IDCT) unit performing an IDCT on the inversely quantized video data.

21. The apparatus of claim 18, wherein the DCT skipping unit further comprises
  a threshold value calculator calculating a threshold value $T_{on+1}$ of the current frame, based on the updated target DCT computational complexity to which the difference in the ME computational complexity is reflected, and
  a DCT skipping decision unit comparing the SAD per block and a quantization parameter (QP) with the threshold value $T_{on+1}$ of the current frame to obtain a compared result, to determine whether to skip performing the DCT process on the current frame.

22. A computer readable storage medium storing computer readable code for controlling a computer to encode a moving image, comprising:
  calculating motion estimation (ME) computational complexity of video data, and estimating a difference between the calculated ME computational complexity and a target ME computational complexity;
  updating a target discrete cosine transform (DOT) complexity based on the difference between the calculated ME computational complexity and the target ME computational complexity;
  setting a threshold value in order to determine whether to skip performing a DCT process on the video data based on the updated target DCT complexity; and
  skip performing the DOT process or performing the DOT process on video data according to the set threshold value.

* * * * *

UNITED STATES PATENT AND TRADEMARK OFFICE
CERTIFICATE OF CORRECTION

| | | |
|---|---|---|
| PATENT NO. | : 7,123,654 B2 | Page 1 of 1 |
| APPLICATION NO. | : 10/321537 | |
| DATED | : October 17, 2006 | |
| INVENTOR(S) | : Byung-cheol Song | |

It is certified that error appears in the above-identified patent and that said Letters Patent is hereby corrected as shown below:

Column 10, Line 53, change "(DOT)" to --(DCT)--.

Column 10, Line 60, after "skip performing the" change "DOT" to --DCT--.

Column 10, Line 60, after "or performing the" change "DOT" to --DCT--.

Signed and Sealed this

Sixth Day of March, 2007

JON W. DUDAS
*Director of the United States Patent and Trademark Office*